L. R. ROSEBROOK.
RAILWAY TRACK SCALE.
APPLICATION FILED JUNE 19, 1916.

1,233,281.

Patented July 10, 1917.
3 SHEETS—SHEET 1.

INVENTOR:
L. R. ROSEBROOK
By Earl M. Sinclair
Atty.

L. R. ROSEBROOK.
RAILWAY TRACK SCALE.
APPLICATION FILED JUNE 19, 1916.

1,233,281.

Patented July 10, 1917.
3 SHEETS—SHEET 2.

INVENTOR:
L. R. ROSEBROOK
By Earl M. Sinclair
Atty.

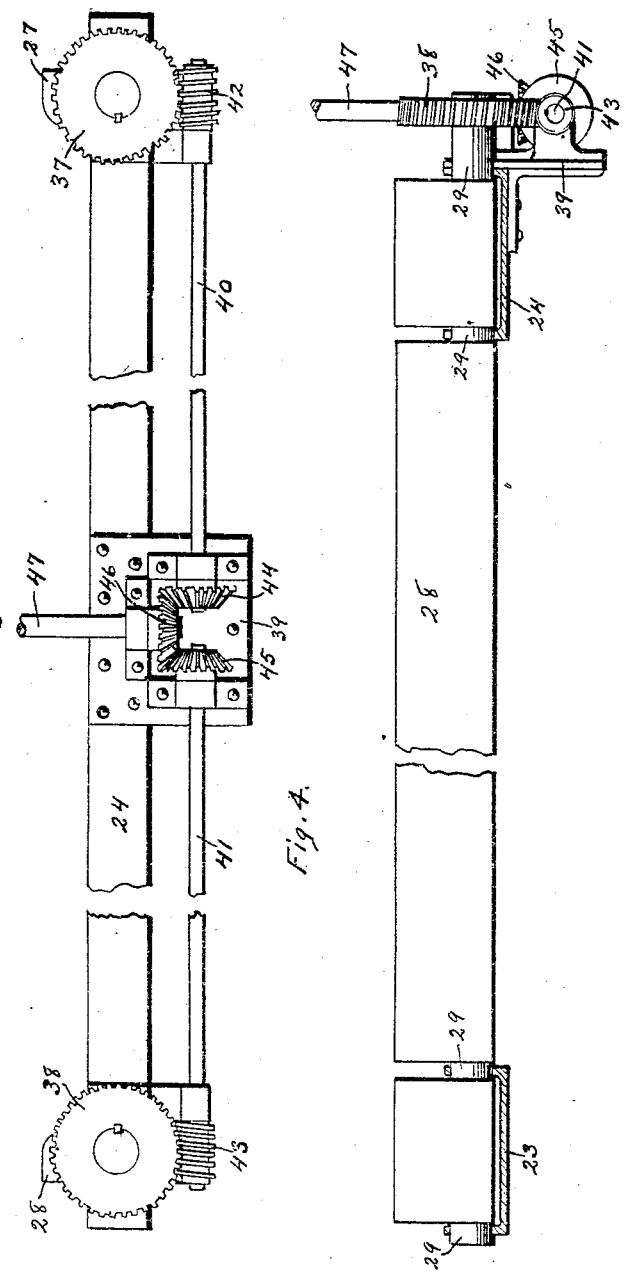

UNITED STATES PATENT OFFICE.

LUCIUS R. ROSEBROOK, OF OSKALOOSA, IOWA, ASSIGNOR, BY DIRECT AND MESNE ASSIGNMENTS, OF TWO-THIRDS TO MARY M. ROSEBROOK, OF OSKALOOSA, IOWA, AND ONE-THIRD TO PETER NEWERF, OF OTTUMWA, IOWA.

RAILWAY-TRACK SCALE.

1,233,281.     Specification of Letters Patent.     Patented July 10, 1917.

Application filed June 19, 1916. Serial No. 104,554.

*To all whom it may concern:*

Be it known that I, LUCIUS R. ROSEBROOK, citizen of the United States of America, and resident of Oskaloosa, Mahaska county, Iowa, have invented a new and useful Railway-Track Scales, of which the following is a specification.

The object of this invention is to provide an improved construction for railway track scales.

A further object of this invention is to provide an improved relieving gear for railway track scales.

A further object of this invention is to provide improved vertically movable grooved rails mounted on the weighing devices and adapted to engage the flanges and portions of the treads of car wheels for the weighing operation.

A further object of this invention is to provide an improved arrangement of the track rails to permit effective engagement of the car wheel by the grooved supporting rails for the weighing operation.

A further object of this invention is to provide improved means for moving wheel-engaging rails to operative position.

A further object of this invention is to provide improved means for mounting the grooved rails.

My invention consists in the construction, arrangement and combination of elements hereinafter set forth, pointed out in my claims and illustrated by the accompanying drawings, in which—

Figure 1:
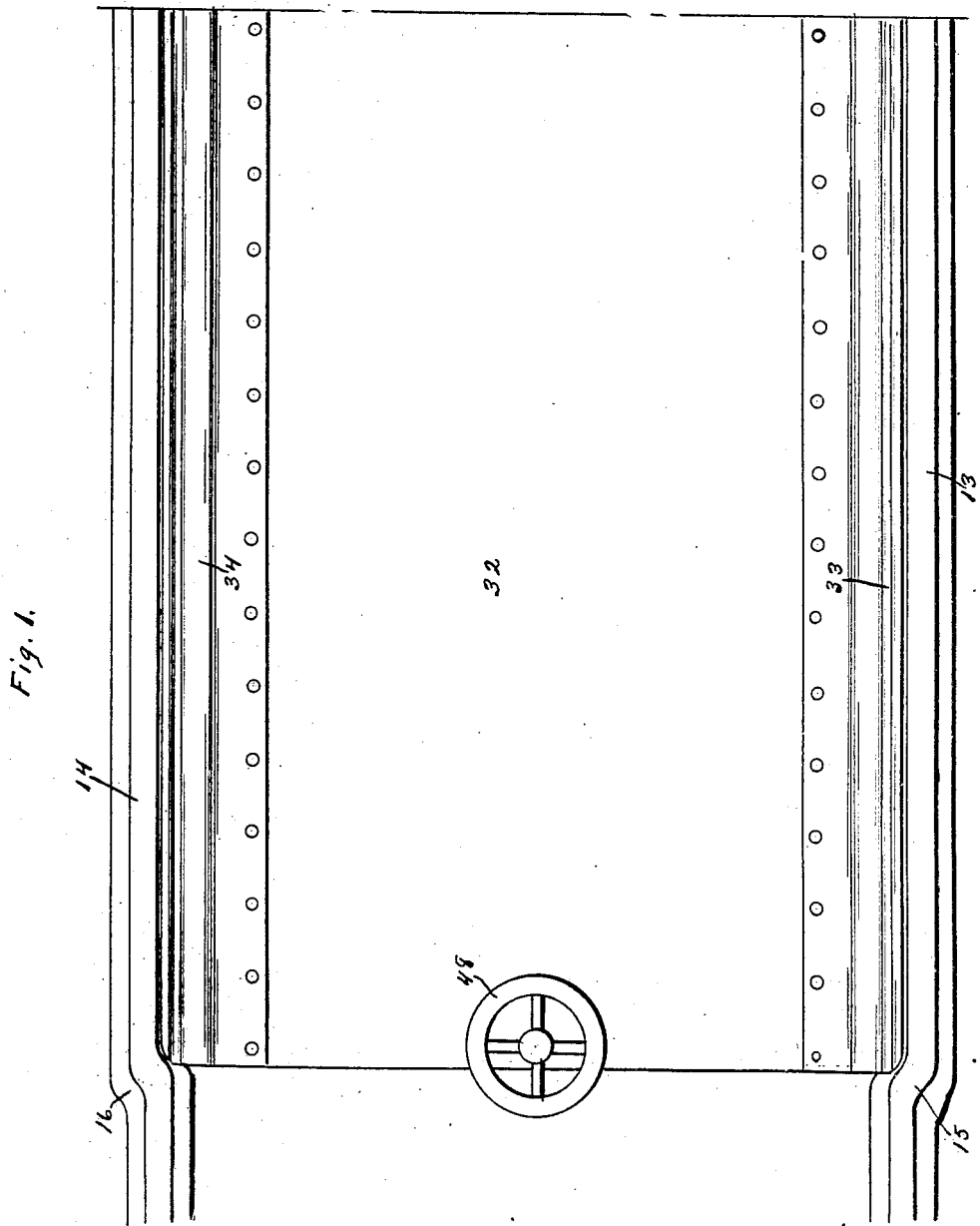
Figure 2:
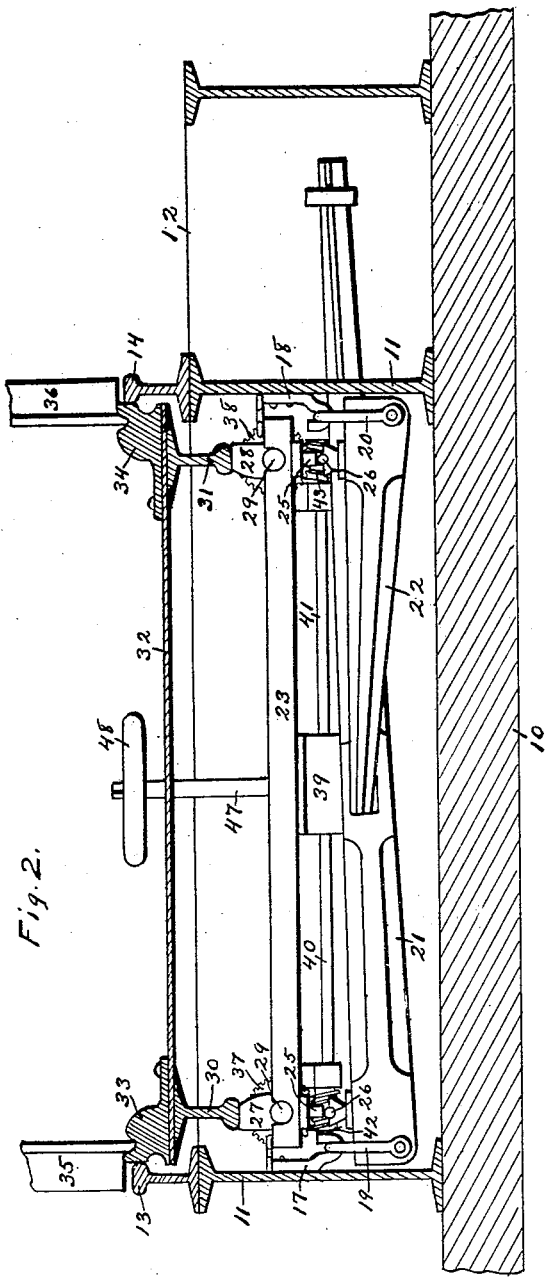

Figure 1 is a plan showing a portion of my improved scale in position relative to the track rails, and indicating the arrangement of said track rails. Fig. 2 is a transverse sectional elevation of the same, illustrating the device in weighing position. Fig. 3 is a detail transverse elevation illustrating the raising and lowering means, on an enlarged scale, portions being broken away to economize space. Fig. 4 is a sectional elevation at right angles to Fig. 3.

In the construction of the device as shown the numeral 10 designates a solid base or foundation of any suitable construction, such as concrete, which extends beneath the entire scale and supports an outer I-beam frame 11, of generally rectangular form. The numeral 12 designates the beam box, which is also formed of I-beams supported by the base 10, and said beam box and the outer I-beam frame 11 inclose all of the weighing devices and levers of the scale. Track rails 13, 14 are mounted on and secured, where they cross the scale, to the longitudinal members of the outer I-beam frame 11, and said rails are continuous from the scale to the ordinary road-bed and have no loose or free ends nor joints at the junction of the scale and road-bed. The rails 13, 14 are each bent, curved or offset outwardly at either end of the scale, as indicated at the points 15, 16, to provide a greater gage or width therebetween throughout the length of the scale. Hooks 17, 18 are mounted on and bolted to the inner sides of the longitudinal members of the outer I-beam frame 11 and pivotally support, through clevises 19, 20, the outer end portions of the main weighing levers 21, 22. I do not illustrate nor describe any of the weighing devices except the main levers 21, 22, as such devices form no part of my present invention, and any suitable arrangement and combination of weighing devices may be employed. Bolsters 23, 24 are spaced apart and arranged transversely of and within the outer I-beam frame 11, and are provided with bearings 25, which are supported by bail or knife-edge devices such as 26 carried by the weighing levers 21, 22. The bolsters 23, 24 preferably are formed of channel iron with their flanges directed upwardly. Cam-shaped bars 27, 28 are mounted longitudinally of the scale and within the I-beam frame 11, and are formed with journals 29 mounted for rotary oscillation in bearings formed in the flanges adjacent the ends of the bolsters 23, 24. The cam bars 27, 28 extend throughout the length of the I-beam frame 11, and support longitudinally arranged sills 30, 31, preferably formed of inverted sections of track rails. A cover plate 32 is mounted on and supported by the sills 30, 31 and covers the space inclosed by the I-beam frame 11, and grooved rails 33, 34 are mounted on and carried by the side margins of said cover plate and lie parallel with and just inside the outset portions of the rails 13, 14. By reason of the outset arrangement of the track rails 13, 14 adjacent the scale, the flanges of car wheels such as 35, 36 resting thereon ed within said frame, supports resting on said levers within said frame, grooved rails mounted for vertical movement upon said supports, and worm gear and shaft connections for raising and lowering said grooved rails simultaneously.

5. A railway track scale, comprising a frame, track rails mounted upon and crossing said frame, main weighing levers mounted within said frame, supports resting on said levers within said frame, cam devices carried by and for rotary oscillation in said supports, sills carried by said cam devices and adapted to be raised and lowered thereby, and grooved rails carried by said sills.

6. A railway track scale, comprising a frame, track rails mounted upon and crossing said frame, main levers mounted within said frame, supports resting on said levers within said frame, cam devices carried by and for rotary oscillation in said supports, sills carried by said cam devices and adapted to be raised and lowered thereby, grooved rails carried by said sills, and worm gear and shaft devices for oscillating said cam devices.

7. A railway track scale, comprising a frame, track rails mounted upon and crossing said frame, main weighing levers mounted within said frame, supports resting on said levers within said frame, cam devices carried by and for rotary oscillation in said supports, sills carried by said cam devices and adapted to be raised and lowered thereby, a cover plate carried by said sills, and grooved rails mounted on side margins of said cover plate.

8. A railway track scale, comprising a frame, track rails mounted upon and crossing said frame, main weighing levers mounted within said frame, transverse supports resting on said levers within said frame, cam devices mounted for rotary oscillation in said supports and extending longitudinally of said frame, grooved rails mounted parallel with said track rails and adapted to be raised and lowered by said cam devices, worm gears fixed to said cam devices, an operating shaft journaled for rotation, worm shafts mounted for rotation and operatively connected to said operating shaft, and worms on said worm shafts meshing with said worm gears.

9. A railway track scale, comprising a frame, track rails mounted upon and crossing said frame, main weighing levers mounted within said frame, supports carried by said levers within said frame, grooved rails mounted for vertical movement upon said supports and adapted to engage both sides and prevent lateral movement of the flanges of car wheels, and means for raising and lowering said grooved rails.

10. A railway track scale, comprising a frame, track rails mounted upon and crossing said frame, main weighing levers mounted within said frame, supports resting on said levers within said frame, cam devices journaled for oscillation in said supports and extending longitudinally within said frame, grooved rails mounted parallel with and between said track rails and adapted to be raised and lowered by said cam devices, an operating shaft journaled for rotation, removable means for rotating said shaft, and operative connections between said operating shaft and cam devices.

Signed by me at Oskaloosa, Iowa.

LUCIUS R. ROSEBROOK.

Witnesses:
H. W. MOORE,
D. W. ECKENBORN.

Copies of this patent may be obtained for five cents each, by addressing the "Commissioner of Patents, Washington, D. C."